United States Patent
Yang et al.

(10) Patent No.: US 7,887,944 B2
(45) Date of Patent: Feb. 15, 2011

(54) INTEGRATED MEMBRANE ELECTRODE ASSEMBLY AND METHOD RELATED THERETO

(75) Inventors: Hai Yang, Shanghai (CN); Tao Wang, Columbia, SC (US); Chang Wei, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1311 days.

(21) Appl. No.: 11/314,908

(22) Filed: Dec. 21, 2005

(65) Prior Publication Data

US 2007/0141473 A1 Jun. 21, 2007

(51) Int. Cl.
*H01M 4/58* (2010.01)
*H01M 10/40* (2010.01)
*H01M 2/16* (2006.01)

(52) U.S. Cl. .................... 429/144; 429/218.2; 429/223; 429/304; 29/623.1; 29/623.5

(58) Field of Classification Search ............. 429/218.1, 429/218.2, 223, 144, 304; 29/623.1, 623.4, 29/623.5
See application file for complete search history.

(56) References Cited

U.S. PATENT DOCUMENTS

| | | | |
|---|---|---|---|
| 2,928,783 A | 3/1960 | Bacon | |
| 2,969,315 A | 1/1961 | Bacon | |
| 3,779,811 A | 12/1973 | Bushnell et al. | |
| 3,905,832 A | 9/1975 | Trocciola | |
| 4,035,551 A | 7/1977 | Grevstad | |
| 4,038,463 A | 7/1977 | Lamarine et al. | |
| 4,522,896 A | 6/1985 | Iseard | |
| 4,754,777 A | 7/1988 | Frode | |
| 4,957,826 A | 9/1990 | Cheiky | |
| 5,219,680 A * | 6/1993 | Fauteux | 429/306 |
| 5,492,683 A | 2/1996 | Birbara et al. | |
| 5,595,949 A | 1/1997 | Goldstein et al. | |
| 5,635,151 A * | 6/1997 | Zhang et al. | 423/445 R |
| 5,837,015 A * | 11/1998 | Venugopal et al. | 29/623.2 |
| 6,265,094 B1 | 7/2001 | Pedicini et al. | |
| 6,383,675 B1 | 5/2002 | Zhong | |
| 6,689,194 B2 | 2/2004 | Pratt et al. | |

(Continued)

FOREIGN PATENT DOCUMENTS

JP 05242906 A2 9/1993

(Continued)

OTHER PUBLICATIONS

Stephan, "Review On Gel Polymer Electrolytes for Lithium Batteries", European Polymer Journal, vol. 42, No. 1, pp. 21-42, Jan. 2006.

(Continued)

*Primary Examiner*—Gregg Cantelmo
(74) *Attorney, Agent, or Firm*—Andrew J. Caruso (57) ABSTRACT

An electrode assembly for use in a galvanic cell is provided. The galvanic cell may include a first electrode, a gel polymer adhesive electrolyte in contact with the first electrode, a polymer tri-phase electrolyte layer, a separator coupled between the gel polymer adhesive electrolyte and the polymer tri-phase electrolyte layer, and a second electrode in contact with the polymer tri-phase electrolyte. A method of making and using an electrode assembly for use in a galvanic cell is provided.

19 Claims, 6 Drawing Sheets

U.S. PATENT DOCUMENTS

| | | | |
|---|---|---|---|
| 6,899,978 | B2 | 5/2005 | Fitter |
| 2003/0192170 | A1 | 10/2003 | Jan et al. |
| 2004/0121227 | A1 | 6/2004 | Cheng et al. |
| 2005/0271939 | A1 | 12/2005 | Xu et al. |

FOREIGN PATENT DOCUMENTS

| | | |
|---|---|---|
| JP | 07073885 A2 | 3/1995 |
| JP | 07272771 A2 | 10/1995 |
| JP | 07282860 A2 | 10/1995 |
| JP | 11204138 A | 7/1999 |
| JP | 11307088 A2 | 11/1999 |
| JP | 2004020017 A | 1/2004 |
| JP | 2005174765 A | 6/2005 |
| JP | 2005285356 A | 10/2005 |
| JP | 2006331681 A | 12/2006 |
| WO | WO98/04015 A1 | 1/1998 |

OTHER PUBLICATIONS

Song et al., "Review of Gel-Type Polymer Electrolytes for Lithium-Ion Batteries", Journal of Power Sources, vol. 77, No. 2, pp. 183-197, Feb. 1999.

Zhang et al., "Microporous Gel Electrolyte Li-Ion Battery", Journal of Power Sources, vol. 125, No. 1, pp. 114-118, Jan. 2, 2004.

Jeong et al., "The Role of An Adhesive Gel-Forming Polymer Coated on Separator for Rechargeable Lithium Metal Polymer Cells", Solid State Ionics, vol. 176, No. 1-2, pp. 47-51, Jan. 14, 2005.

Kim et al., "Gel-Coated Membranes for Lithium-Ion Polymer Batteries", Solid State Ionics, vol. 138, No. 1-2, pp. 41-49, Dec. 1, 2000.

Sam Wong and Rob Bioletti "Carbon Dioxide Separation Technologies", Carbon & Energy Management Alberta Research Council, Edmonton, Alberta, T6N 1E4, Canada. pp. 14. Available at http://www.aidis.org.br/span/ftp/CARBON%20DIOXIDE%20SEPARATION%20TECHNOLOGIES.pdf.

Takeshi Endo et al., "A Novel Construction of a Reversible Fixation-Release System of Carbon Dioxide by Amidines and Their Polymers". Macromolecules vol. 37, No. 6, 2004 pp. 2007-2009.

C. Iwakura et al., "The possible use of polymer gel electrolytes in nickel/metal hydride battery", Solid State Ionics 148 (2002) pp. 487-492.

N. Vassal et al., "Alkaline Solid Polymer Electrolytes: Application to Secondary Air-Metal Hydride Batteries:", Electrochemical Society Proceedings, vol. 97-18 pp. 869-880 Supplied by the British Library—"The world's knowledge" www.bl.uk.

D. Chartouni et al., "Air-metal hydride secondary battery with long cycle life", Journal of Alloys and Compounds 330-332 (2002) pp. 766-770.

E.K. Zholkovskij et al., "The storage battery with bipolar membranes", Journal of Membrane Science 141 (1998) pp. 231-243.

J. Heikonen "Mathematical analysis of potential losses in a thick porous metal-hydride electrode during a discontinuous discharge", Journal of Power Sources 66 (1997) pp. 61-69.

Tsenter, B.I "Universal Gas Absorber for Sealed Alkaline Storage Batteries", Soviet Electrochemistry (English Translation of ElektroKhimiia) V 21, n 8, Aug. 1985, pp. 1019-1022.

\* cited by examiner

INTEGRATED MEMBRANE ELECTRODE ASSEMBLY AND METHOD RELATED THERETO

FIELD OF TECHNOLOGY

Embodiments of the invention relate to an integrated membrane electrode assembly for use in a fuel cell or battery. Specifically, embodiments relate to an integrated membrane electrode assembly for use in a rechargeable fuel cell or metal/air battery.

BACKGROUND

A fuel cell may convert the chemical energy of a fuel directly into electricity without any intermediate thermal or mechanical processes. Energy may be released when a fuel reacts chemically with oxygen in the air. A fuel cell may convert hydrogen and oxygen into water. The conversion reaction occurs electrochemically and the energy may be released as a combination of electrical energy and heat. The electrical energy can do useful work directly, while the heat may be dispersed.

Fuel cell vehicles may operate on hydrogen stored onboard the vehicles, and may produce little or no conventional undesirable by-products. Neither conventional pollutants nor green house gases may be emitted. The byproducts may include water and heat. Systems that rely on a reformer on board to convert a liquid fuel to hydrogen produce small amounts of emissions, depending on the choice of fuel. Fuel cells may not require recharging, as an empty fuel canister could be replaced with a new, full fuel canister.

Metal/air batteries may be compact and relatively inexpensive. Metal/air cells include a cathode that uses oxygen as an oxidant and a solid fuel anode. The metal/air cells differ from fuel cells in that the anode may be consumed during operation. Metal/air batteries may be anode-limited cells having a high energy density. Metal/air batteries have been used in hearing aids and in marine applications, for example.

It may be desirable to have a fuel cell and/or a metal/air battery having differing characteristics or properties than those currently available.

BRIEF DESCRIPTION

Embodiments of the invention may relate to an electrode assembly for use in a galvanic cell. The galvanic cell, such as a fuel cell or battery, includes a first electrode, a gel polymer adhesive electrolyte in contact with the first electrode, a separator coupled between the gel polymer adhesive electrolyte and a polymer tri-phase electrolyte, and a second electrode in contact with the polymer tri-phase electrolyte. Embodiments also relate to methods of making an electrode assembly for use in a galvanic cell.

A method embodiment may include coating a first electrode with a layer of polymer tri-phase electrolyte sufficient to provide a first coated electrode, contacting the first coated electrode with a membrane sufficient to provide a coated electrode-membrane structure, coating a second electrode with a layer of gel polymer adhesive electrolyte sufficient to provide a second coated electrode, and assembling the coated electrode-membrane structure with the second coated electrode sufficient to provide an electrode assembly in which the membrane separates the gel polymer adhesive electrolyte and polymer tri-phase electrolyte layers.

DESCRIPTION OF THE DRAWINGS

Embodiments of the invention may be understood by referring to the following description and accompanying drawings that illustrate such embodiments. In the drawings.

DETAILED DESCRIPTION

Embodiments of the invention relate to an integrated membrane electrode assembly for use in a fuel cell or battery. Specifically, embodiments relate to an integrated membrane electrode assembly for use in a rechargeable fuel cell or metal/air battery.

References in the specification to "one embodiment," "an embodiment," "an example embodiment," indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. The embodiments of the present invention relate to an integrated membrane electrode assembly for use in a fuel cell or battery.

Figure 1:
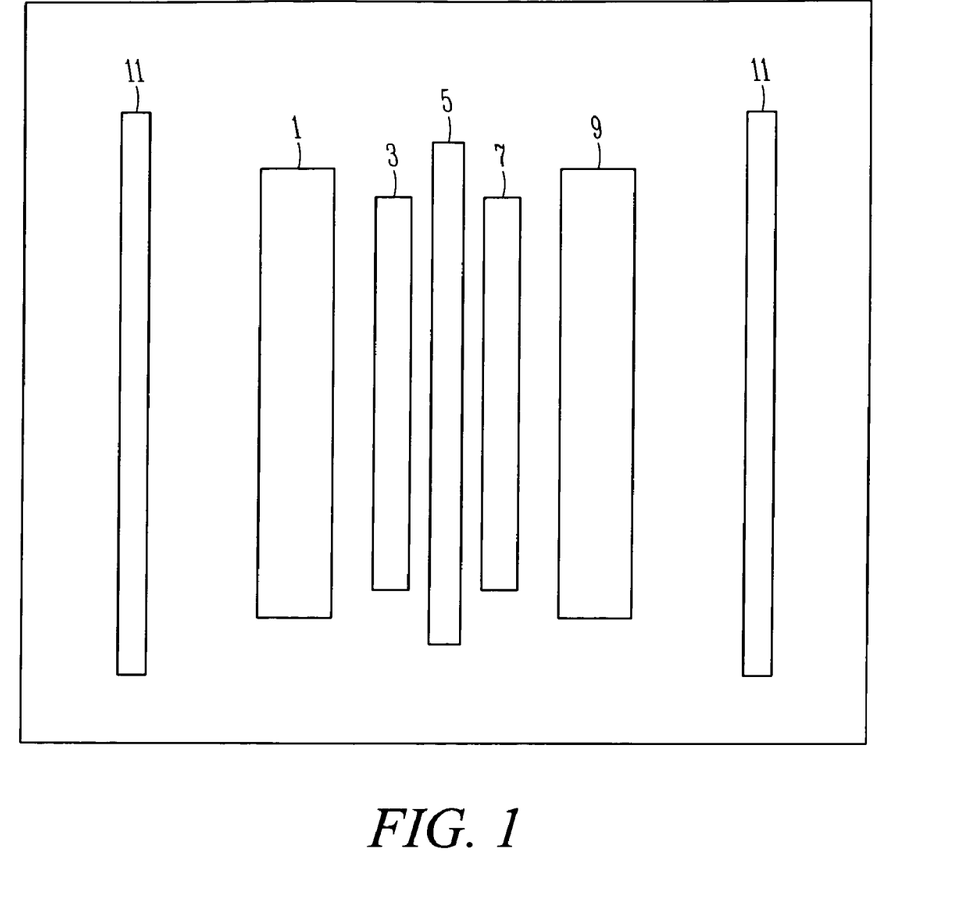
FIG. 1 illustrates a perspective view depicting an electrode assembly, according to some embodiments of the invention.

One embodiment of the invention, illustrated in FIG. 1, includes an integrated membrane electrode assembly (MEA) for use in a galvanic cell, such as a fuel cell or battery. The integrated MEA assembly may include differing layers. In the illustrated embodiment, there are five layers. The layers include first electrode 1, gel polymer adhesive layer 3, membrane 5, polymer tri-phase electrolyte layer 7, and second electrode 9.

The first electrode 1 may be coated with, in contact with, or in electrical communication with, the gel polymer adhesive layer 3. The membrane 5 may function as a separator between the gel polymer adhesive layer 3 and a polymer tri-phase electrolyte layer 7. The polymer tri-phase electrolyte layer 7 may be coated with, in contact with, or in electrical communication with, the second electrode 9. Optional current collectors 11 may be placed on either side of the integrated MEA. Suitable current collectors may include bi-polar plates. The complete assembly may be a fuel cell or a battery.

Such an integrated MEA may reduce contact resistance between the electrodes 1, 9 and the membrane separator 5. Further, electrolyte may be retained. Such electrolyte retention may increase duration of use time.

Generally, the integrated MEA embodiments described herein may enhance electrical and mechanically contact and communication of a membrane separator relative to one or more of the electrodes in a fuel cell or battery. A relatively reduced surface roughness of one or more of the electrodes and the separator may lower contact resistance. The provision of a platform and interface for the electrochemical reactions to occur may reduce reaction resistance. Thus, the internal resistance may be desirably low. A low internal resistance may increase electrical dischargeability. In addition, the presence of a polymer electrolyte between the electrodes and the separator may retain the electrolyte between the electrodes and separator. The cell would be replenished with electrolyte and maintain open circuit voltage (OCV). Further, eliminating a bare pressing of the electrodes and separator may reduce a tendency to break the separator. Such a break may cause electrical shorting.

The gel polymer adhesive electrolyte layer 3 located between the first electrode 1 and the membrane separator 5 may be water-soluble, may be conductive to ions, or may be both. Suitable ion conductivity may include hydroxide ion conductivity. The gel polymer adhesive electrolyte can absorb and retain water/electrolyte while allowing hydroxide ions to move therethrough. Therefore, when coupling the first electrode 1 and membrane separator 5 together with this type of gel polymer adhesive electrolyte layer 3 in between, the highly ion-conductive polymer may reduce the contact resistance, relative to a rougher surface. The gel polymer adhesive electrolyte layer 3 may absorb electrolyte ions and retain the ions during the operation. The control over the ion migration may reduce or prevent electrolyte starvation.

In addition, the gel polymer adhesive electrolyte layer 3 may supply a platform for the electrochemical reaction. The presence of a reaction platform may reduce reaction resistance. Such a reaction may be exemplified as:

$4M+4H_2O+4e^- \Longleftrightarrow 4MH+4OH^-$.

The polymer tri-phase electrolyte layer 7 between the second electrode 9 and membrane separator 5 may be relative hydrophobic. Hydrophobic means that there is a tendency to repel polar fluid, and a reduced tendency to wet out such a surface. It will form a 3-phase (solid, liquid, gas) interface between the second electrode 9 and separator 5, which is required for the oxygen reduction/evolution reaction:

$4OH^- \Longleftrightarrow 2H_2O+O_2+4e^-$.

In addition, the hydrophobic nature of the polymer tri-phase electrolyte layer 7 prevents the flooding of the second electrode 9.

Overall, adoption of the MEA structure embodiments described herein significantly reduces the internal resistance, thus increasing the discharge voltage, current and output power density. In addition, it can retain plenty of electrolyte and thus substantially improve the shelf life.

The gel polymer adhesive electrolyte layer 3 may include, in one embodiment, a cellulosic material, such as carboxymethyl cellulose (CMC). The carboxymethyl cellulose may be at least partially dissolved in a base solution. Other suitable materials for use in the gel polymer adhesive electrolyte layer 3 may include one or more of polyethylene oxide (PEO), sodium polyacrylate, poly(N,N-dimethyl-2-diallyl-ammonium hydroxide) (PDMDAA), glycerin, polyacrylic acid, or triethanol amine (TEA).

A suitable base solution may be, for example, sodium hydroxide. About 1 gram of carboxymethyl cellulose may dissolve in about 100 ml of 2.5 molar (M) sodium hydroxide at about 50 degrees Celsius. Other suitable base solutions used to prepare the gel polymer adhesive electrolyte layer 3 may include one or more of potassium hydroxide, cesium hydroxide, lithium hydroxide, calcium hydroxide or ammonium hydroxide. The concentration of the base may be in a range of from about 1 M to about 2 M, from about 2 M to about 3 M, from about 3 M to about 4 M, from about 4 M to about 5 M, or from about 5 M to about 6 M. In one embodiment, the concentration may be in a range of from about 2.2 M and 2.9 M. The temperature used to dissolve the polymer in the base solution may be in a range of from about 30 degrees Celsius to about 40 degrees Celsius, from about 40 degrees Celsius to about 50 degrees Celsius, from about 50 degrees Celsius to about 60 degrees Celsius, from about 60 degrees Celsius to about 70 degrees Celsius, from about 70 degrees Celsius to about 80 degrees Celsius, or from about 80 degrees Celsius to about 90 degrees Celsius. In one embodiment, the temperature may be in the range of 45 degrees Celsius and 55 degrees Celsius.

The polymer tri-phase electrolyte layer 7 may include polymer, such as halogenated olefin latex. A suitable halogenated olefin may include, for example, polytetrafluoroethylene (PTFE) latex mixed with a polar fluid, such as water. In one embodiment, the polymer tri-phase electrolyte layer 7 may include 2 parts of 60 weight percent PTFE latex mixed with 18 parts of de-ionized (DI) water. The mixture may be agitated to uniformly distribute. Other suitable polymers may include polyvinyl alcohol, PVDF, polyethylene, polypropylene, halogenated derivatives, and the like. The amount of polymer may be in a range of from about 1 weight percent to about 5 weight percent, from about 5 weight percent to about 15 weight percent, from about 15 weight percent to about 25 weight percent, from about 25 weight percent to about 35 weight percent, from about 35 weight percent to about 45 weight percent, from about 45 weight percent to about 60 weight percent, from about 60 weight percent to about 75 weight percent, or greater than about 75 weight percent. In one embodiment, the amount of polymer may be in a range of from about 55 weight percent to about 60 weight percent. In one embodiment, the polymer tri-phase electrolyte layer 7 may consist essentially of polytetrafluoroethylene (PTFE) latex mixed with a polar fluid.

The membrane 5 may separate the electrolyte layers from each other. The separation may be one or more of spatial or electrical, and if electrical the separation may be a determined gradient level of insulation or resistance. The membrane 5 may be an electrically insulating material having relatively high ion conductivity. The electrically insulating material may be inherently electrically insulative, filled with inherently electrically insulative filler, or both. Further, the membrane 5 may be relative stable in alkaline environments. Examples of suitable membrane materials may include thermoplastic materials such as nylon, polyethylene (PE), or polypropylene (PP); composites of PE and PP, inorganic materials such as asbestos; or thermoset plastics such as flexible epoxies or silicones. The membrane may be mesh, mat, woven, or non-woven; or may be perforate or expanded.

The first electrode 1 may be an anode. An anode, or negative electrode, may be a readily oxidizable substance. The term anode applies to the electrode where oxidation takes place and in where electrons are given up. An anode may include a hydrogen storage-based material. Suitable hydrogen storage-based materials may include a metal hydride. A suitable metal hydride may be $LaNi_5$. Other suitable metal hydrides may include one or more of $AlH_3$, $SiH_4$, $LiH$, $BeH_2$, $GaH_3$, or $SbH_3$. The anode may be constructed using an active material, such as the metal hydride, a binder and conductive additives. A suitable binder may be a gel mixture of PTFE and carboxymethylcellulose (CMC). In one embodiment, the conductive additive may be carbonyl nickel powder.

The second electrode 9 may be a cathode. A cathode, or positive electrode, may be a readily reducible substance. The term cathode applies to the electrode where reduction takes place and where electrons are accepted. The cathode may comprise an air or gas electrode. Such electrodes may include a catalyst layer and gas diffusion layer. The catalyst layer may be made of a catalyst, active carbon and binder. The catalyst may be a metal catalyst, metal oxide catalyst or Perovskite catalyst. Suitable catalysts may include one or more of $CaTiO_3$ or $MgSiO_3$. The gas diffusion layer may comprise an active carbon and the binder. An example of a binder may be polytetrafluoroethylene (PTFE).

The galvanic cell may be a fuel cell, such as a rechargeable fuel cell. The rechargeable fuel cell may include an alkaline fuel cell. The galvanic cell may be a battery, such as a metal/air battery. The metal/air battery may be a primary or secondary metal/air battery.

Figure 2:
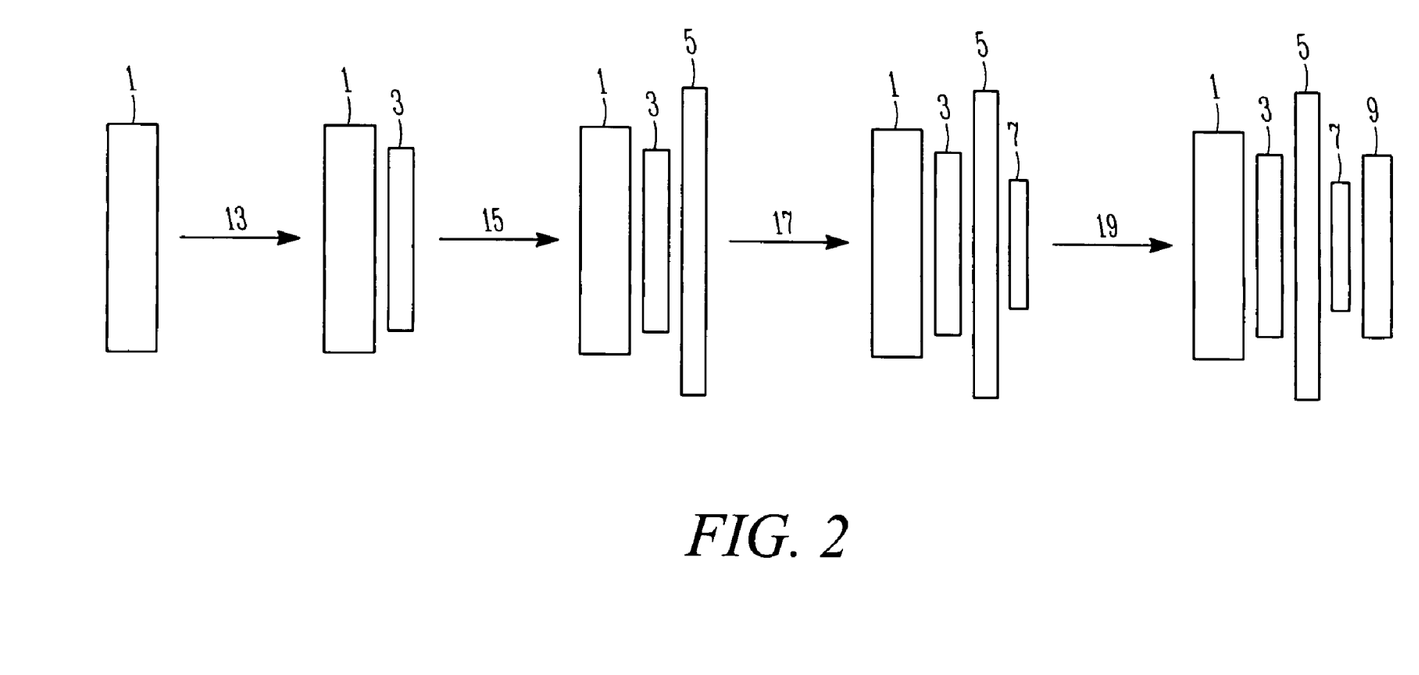
FIG. 2 illustrates a perspective depicting a process of making an electrode assembly, according to some embodiments of the invention.
Figure 3:
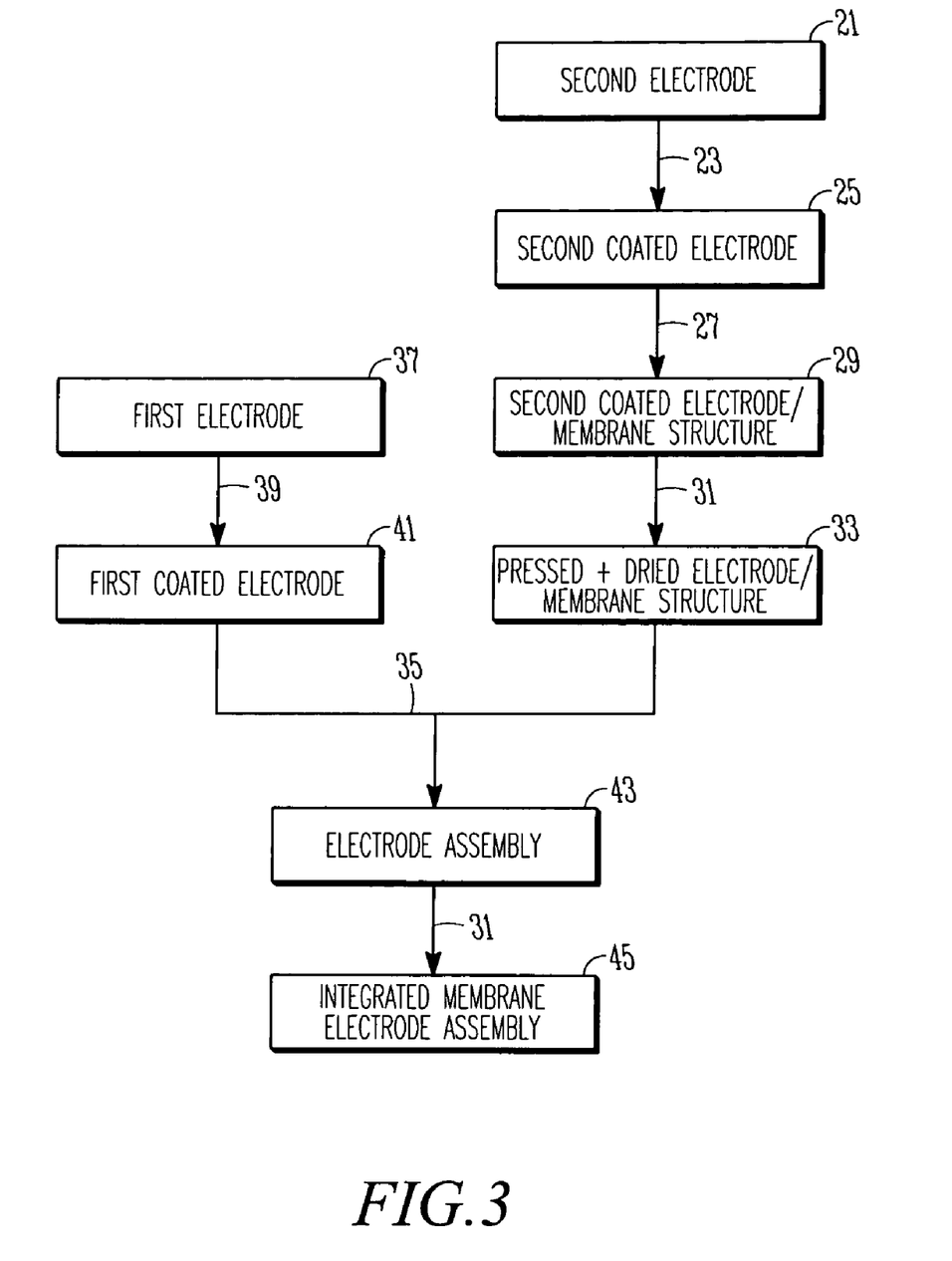
FIG. 3 illustrates a flow diagram depicting a process of making an electrode assembly, according to some embodiments of the invention.

One embodiment of the invention, illustrated generally in FIGS. 2 and 3, may provide a process for making an integrated membrane electrode assembly for use in a galvanic cell, such as a fuel cell or battery. Referring to FIG. 2, a perspective view illustrates an assembly of an integrated MEA, which may or may not be sequential in layering. The embodiments illustrated in FIGS. 2 and 3 have many components that are substantially the same as corresponding parts of the embodiment shown in FIG. 1. This is indicated by the use of the same reference numbers for such corresponding parts in the Figs.

The first electrode 1 may be coated 13 or layered with a gel polymer adhesive electrolyte layer 3. A membrane 5 may next be contacted 15 on the gel polymer side of the assembly. The polymer tri-phase electrolyte layer 7 is assembled 17 on the opposite side of the membrane 5 as the gel polymer adhesive electrolyte layer 3. The second electrode 9 completes the MEA by contacting 19 the assembly next to the polymer tri-phase electrolyte layer 7 layer. Contacting and assembling refers to processes such as pressing, mechanically binding, or chemically binding layers together.

Referring to FIG. 3, a flow diagram illustrates a method of making an integrated membrane electrode assembly, according to some embodiments of the invention. A first electrode 37 may be coated 39 with a layer of gel polymer adhesive electrolyte to form a first coated electrode 41. A second electrode 21 may be coated 23 with a polymer tri-phase electrolyte to form a second coated electrode 25. The second coated electrode 25 may be pressed 27 with a membrane to form a second coated electrode/membrane structure 29. The structure 29 may be optionally pressed and dried 31 to form a more stable pressed and dried second coated electrode/membrane structure 33.

The first coated electrode 41 is assembled 35 with the pressed second electrode/membrane structure 33 to form an electrode assembly 43. The two sections are assembled so that the membrane separates the polymer tri-phase coated second electrode and the gel polymer adhesive coated first electrode. The electrode assembly 43 may be pressed and dried 31 to form an integrated membrane electrode assembly 45. The layers may be contacted or assembled by pressing using a press machine. The press pressure may be in the range of from about 1 megaPascal (MPa) to about 5 MPa, from about 5 MPa to about 15 MPa, or from about 15 MPa to about 20 MPa. In one embodiment, the pressure may be in the range of from about 1.5 MPa to about 6 MPa. The temperature used to press and/or dry the layers of the assembly may be in the range of from about 30 degrees Celsius 100 degrees Celsius, from about 100 degrees Celsius to about 150 degrees Celsius, or from about 150 degrees Celsius to about 350 degrees Celsius. The time used to press the sections together may be in the range of from about 1 second to about 5 hours. The dry time used may be in the range of from about 5 minutes to about 10 minutes, from about 10 minutes to about 12 minutes, from about 12 minutes to about 18 minutes, or from about 1 hour to about 24 hours.

Figure 4:
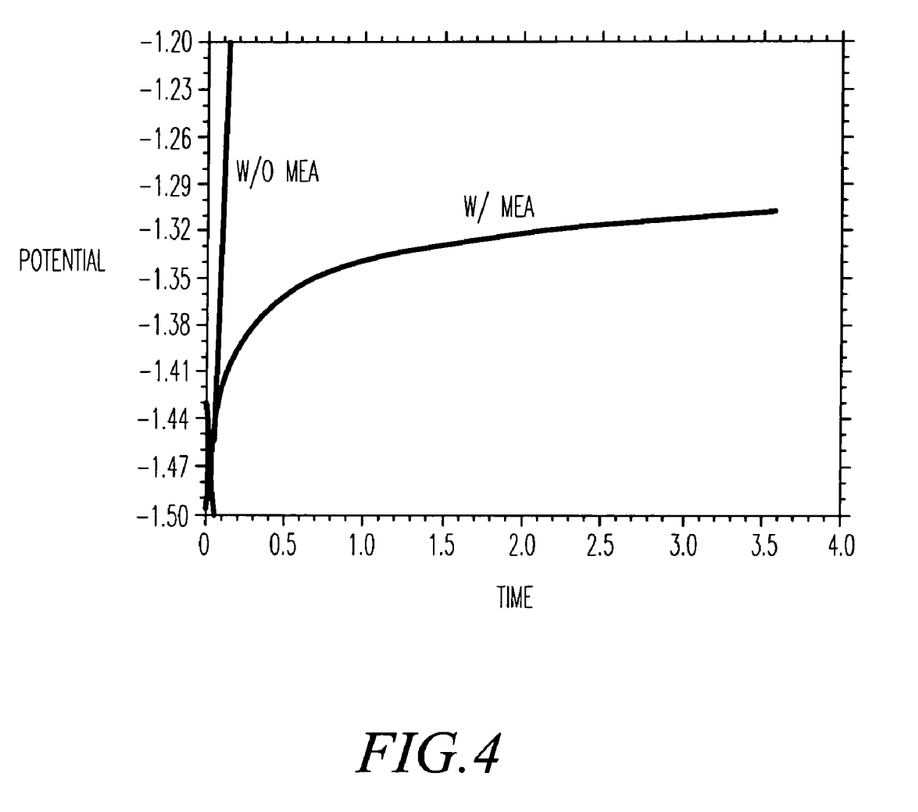
FIG. 4 illustrates a graphical view depicting open circuit voltage (OCV) as a function of time immediately after charging a single cell with or without the electrode assembly, according to some embodiments of the invention.

FIG. 4 shows the open circuit voltage (OCV) as the function of time immediately after charging for a single cell, according to some embodiments of the invention. An OCV may be compared as to with or without the electrode assembly. The single cell with the electrode assembly shows a much slower OCV decay.

Figure 5:
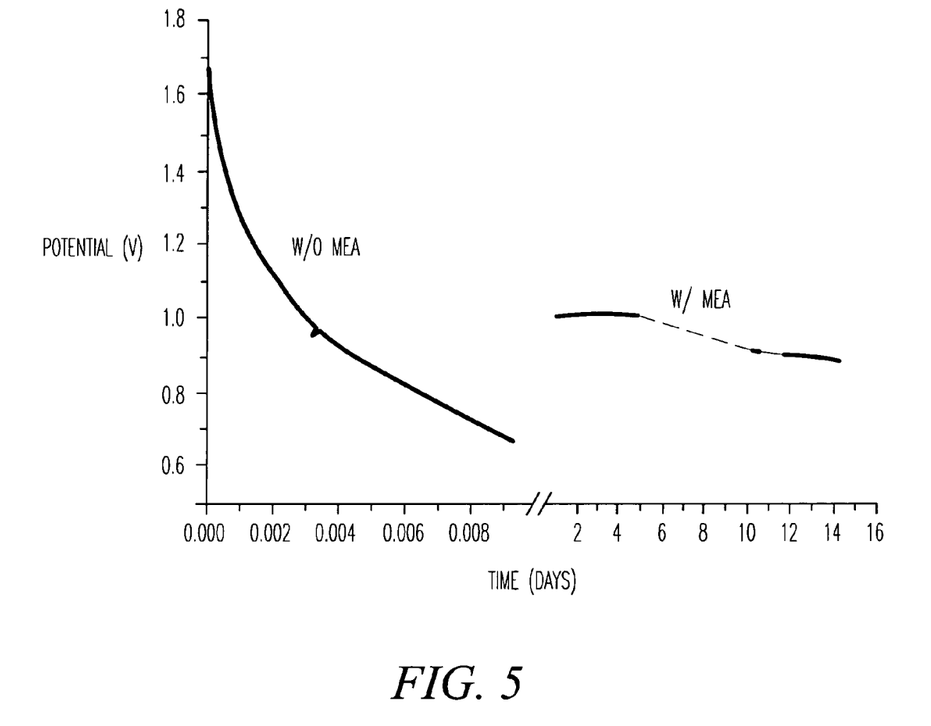
FIG. 5 illustrates a graphical view depicting the open circuit voltage (OCV) variation over time, according to some embodiments of the invention.

FIG. 5 shows the long term OCV variation, according to some embodiments of the invention. Because the single cell adopting the electrode assembly retains electrolyte for a longer time, the OCV may be retained for a longer time. In the single cell without the electrode assembly, the single cell may become electrolyte starved relatively quickly, or there is serious electrical shorting and the cell may lose OCV relatively quickly.

Figure 6:
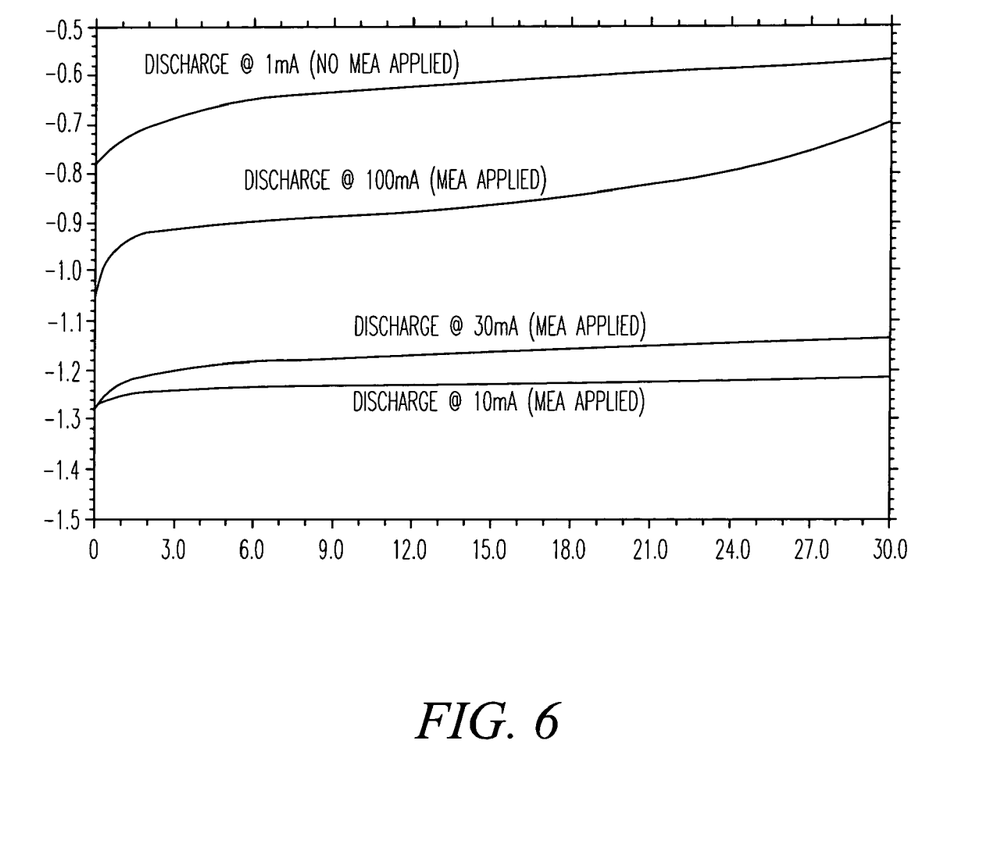
FIG. 6 illustrates a graphical view depicting the discharge performance for a single cell with or without the electrode assembly, according to some embodiments of the invention.

FIG. 6 shows the discharge performance for a single cell with or without adopting the electrode assembly, according to some embodiments of the invention. The single cell without the electrode assembly can only be discharged at 1 mA and the discharge voltage is very low. For the single cell with the electrode assembly, the inside can be discharged at 10 milli-Amp (mA), 30 mA, or 100 mA current and discharge voltage is relatively higher than that of single cell without the electrode assembly. The use of the electrode assembly may reduced the internal resistance and/or may improve one or more of the discharge current, discharge voltage, or output power density.

The embodiments described herein are examples of compositions, structures, systems and methods having elements corresponding to the elements of the invention recited in the claims. This written description may enable one of ordinary skill in the art to make and use embodiments having alternative elements that likewise correspond to the elements of the invention recited in the claims. The scope thus includes compositions, structures, systems and methods that do not differ from the literal language of the claims, and further includes other compositions, structures, systems and methods with insubstantial differences from the literal language of the claims. While only certain features and embodiments have been illustrated and described herein, many modifications and changes may occur to one of ordinary skill in the relevant art. The appended claims are intended to cover all such modifications and changes.

What is claimed is:

1. An electrode assembly, comprising:
   a first electrode, the first electrode comprising an anode, the anode comprising an active material, a binder, and at least one conductive additive, wherein the active material is a metal hydride;
   a gel polymer adhesive electrolyte layer, in contact with the first electrode;
   a polytetrafluoroethylene latex layer;
   a separator, coupled to the gel polymer adhesive electrolyte layer and to the polytetrafluoroethylene latex layer; and
   a second electrode, in contact with the polytetrafluoroethylene latex layer.

2. The electrode assembly of claim 1, wherein the metal hydride comprises one or more of $AlH_3$, $SiH_4$, $LiH$, $BeH_2$, $GaH_3$, or $SbH_3$.

3. The electrode assembly of claim 1, wherein the metal hydride comprises $LaNi_5$.

4. The electrode assembly of claim 1, wherein the gel polymer adhesive electrolyte comprises a polymer at least partially dissolvable in a base solution, and the polymer is selected from the group consisting of carboxymethyl cellulose, polyethylene oxide, sodium polyacrylate, poly(N,N-dimethyl-2-diallyl-ammonium hydroxide), glycerin, polyacrylic acid, triethanol amine, and combinations of two or more thereof.

5. The electrode assembly of claim 4, wherein the base is selected from the group consisting of sodium hydroxide, potassium hydroxide, cesium hydroxide, lithium hydroxide, calcium hydroxide, ammonium hydroxide, and combinations of two or more thereof.

6. The electrode assembly of claim 1, wherein the separator is a non-woven membrane.

7. The electrode assembly of claim 1, wherein the separator comprises one or more of polyethylene, polypropylene, asbestos, or nylon.

8. The electrode assembly of claim 1, wherein the second electrode comprises a cathode.

9. The electrode assembly of claim 8, wherein the cathode comprises an air/gas electrode with a catalyst layer and gas diffusion layer.

10. The electrode assembly of claim 9, wherein the catalyst layer comprises catalyst, active carbon and a halogenated olefin binder.

11. The electrode assembly of claim 10, wherein the catalyst is selected from the group comprising metal catalyst, metal oxide catalyst and a Perovskite catalyst.

12. The electrode assembly of claim 9, wherein the gas diffusion layer comprises active carbon and a halogenated olefin binder.

13. The electrode assembly of claim 12, wherein the binder comprises one or both of polytetrafluoroethylene or carboxymethylcellulose.

14. A galvanic cell comprising the electrode assembly of claim 1, wherein the galvanic cell is a metal/air battery.

15. A galvanic cell comprising the electrode assembly of claim 1, and one or more current collectors that are in contact with at least one of the first electrode or the second electrode.

16. A method of making an electrode assembly for use in a galvanic cell, comprising:
    coating a first electrode with a layer of gel polymer adhesive electrolyte to provide a first coated electrode, the first electrode comprising an anode, the anode comprising an active material, a binder, and at least one conductive additive, wherein the active material is a metal hydride;
    contacting the first coated electrode with a separator to provide a coated electrode-membrane structure;
    coating a second electrode with a layer of polytetrafluoroethylene latex to provide a second coated electrode; and
    assembling the coated electrode-membrane structure with the second coated electrode to provide an electrode assembly.

17. The method of claim 16, wherein assembling and contacting each comprises pressing.

18. The method of claim 17, wherein pressing comprises contacting materials under an elevated pressure.

19. The method of claim 16, wherein coating comprises chemically layering or mechanically layering a material onto another material.

* * * * *